Feb. 17, 1953 — C. HERZSTARK — 2,628,429
MEASURING LEG WITH AN ADJUSTABLE MEASURING SURFACE FOR GAUGES
Filed April 6, 1950
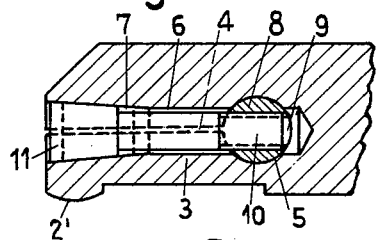
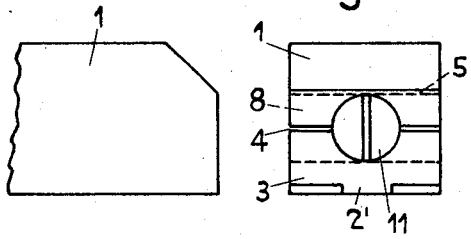
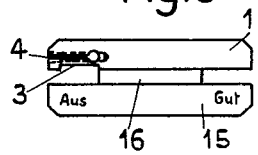
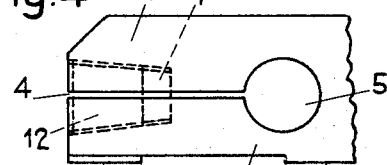
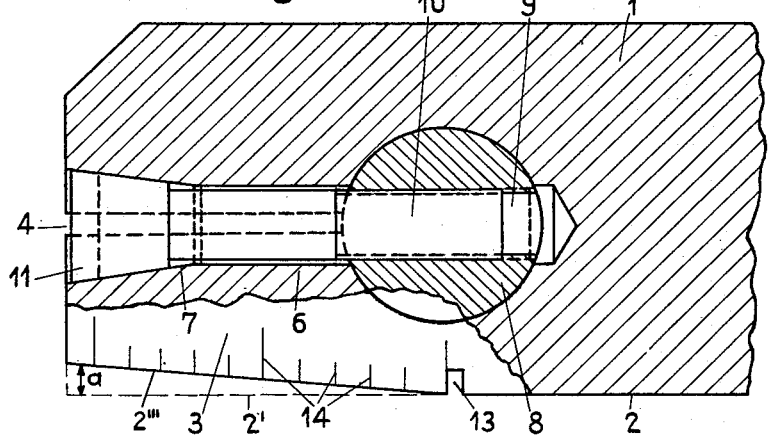
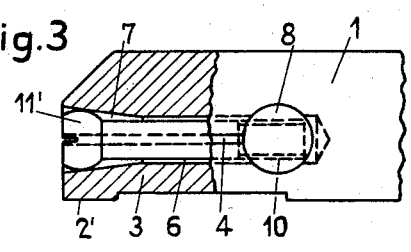
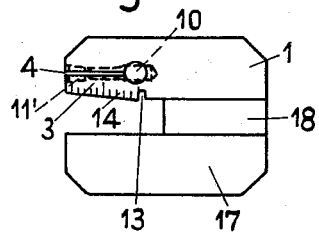
Inventor:
Curt Herzstark,
by Singer, Stern & Carlberg,
Attorneys.

Patented Feb. 17, 1953

2,628,429

UNITED STATES PATENT OFFICE 2,628,429

MEASURING LEG WITH AN ADJUSTABLE MEASURING SURFACE FOR GAUGES

Curt Herzstark, Mauren, Liechtenstein

Application April 6, 1950, Serial No. 154,244
In Austria April 8, 1949

2 Claims. (Cl. 33—168)

This invention relates to gauges or measuring devices. More particularly, the invention relates to a gauge provided with a measuring leg having an adjustable measuring surface which may be used to advantage as an auxiliary measuring device and also for assembling temporary exterior gauges and may also be used as a part of a "go" and "no-go" snap or horseshoe gauge and also for measuring gauges or blocks.

A primary object of the invention is to provide a gauge with an adjustable measuring surface.

Another object of the invention is to provide a gauge in which the measuring projection of conventional gauges is completely eliminated.

Still another object of the invention is to provide a gauge construction in which only the measuring legs have to be ground and lapped when re-adjusting the gauge while the other parts of the gauge do not have to be ground.

A further object of the invention is to provide an adjusting means for a gauge wherein the gauge may be adjusted within certain limits by adjusting the measuring surface and in which this adjustment may be made without changing the end dimensions of the opening of the gauge.

Another object of the invention is to provide a gauge by which the dimension of a work piece to be measured may be taken within the permissible tolerances with great accuracy and the dimension may be that of the measuring scale in conjunction therewith.

In accordance with the present invention, the adjustability of the measuring surface on a measuring leg of a gauge is accomplished by providing a measuring surface which is arranged on an adjustable tongue on the measuring leg. When the measuring leg is used in "go" and "no-go" horseshoe or snap gauges, the normally required measuring step which in known forms of gauges requires a delicate measuring projection is completely eliminated. The advantage of this is quite apparent when the gauge must be refinished since in this case, only the measuring legs have to be ground completely flat again whereas the other parts of the gauge do not have to be ground. In addition, the center portion of the gauge which forms the desired dimension is not subjected to wear and therefore need not be refinished.

In temporary snap or exterior gauges, the utilization of the measuring leg construction of my invention has the advantage that a mechanic may adjust the gauge within certain limits by adjusting the measuring surface. This may be done without changing the end dimensions of the opening of the gauges.

Furthermore, a measuring device constructed in accordance with the present invention may also be used in connection with the measuring leg of stationary and exterior gauges (such as preliminary calipers) which indicate the amount of the oversize dimension whereby when this dimension is compared, for example, with preliminary calipers of known dimensions, an advantage which may be obtained is that the angle of inclination of the measuring surface and therewith the measuring range of the gauge may be changed within certain limits.

The above and other objects of my invention will appear from the following description of several embodiments thereof, reference being had to the accompanying drawing, in which:

Figure 1 is a side elevational view, partly in section, and illustrates a preferred adjusting means for the measuring leg of the invention;

Figure 2 is an end view of the embodiment of Figure 1;

Figures 3 and 4 illustrate, respectively, in a longitudinal section and in a side elevational view two additional modifications of the adjusting means for the measuring device constructed according to the invention;

Figure 5 illustrates in side elevation a "go" and "no-go" exterior gauge with a measuring leg constructed according to Figs. 1 and 3 of the invention;

Figure 6 illustrates in side elevation on an enlarged scale, partly in section, another embodiment of a measuring leg for use with gauges; and, Figure 7 illustrates in side elevation a divided one sided exterior gauge formed with a measuring leg according to Fig. 6 of the invention.

Referring now particularly to Figures 1 to 4, the measuring legs provided with the device of my invention illustrated therein are intended to be used for divided rigid exterior gauges and also for temporary limit exterior gauges indicating end dimensions. A measuring leg 1, Figure 1, is provided with a measuring surface 2 on the end of the leg. This surface is ground very finely and polished; and also, there is provided in front of it a curved portion 2' on a yieldable tongue 3. In order to measure a work piece according to the Taylor principle, the part 2' of the measuring surface 2 at the entrance of the gauge is made short and narrow. It may, in order to measure with point or line contact be ground correspondingly as shown in Figure 1.

The tongue 3 is formed integral with the body of measuring leg in such a manner that the body of the leg is provided with a narrow longitudinal slot 4 which is connected with a bore 5 extending transversely through the body of the leg. Furthermore, the measuring leg 1 is provided with a cylindrical bore 6 extending parallel to the slot 4. The slot 4 is formed upon the axis of the bore 6 and at right angles to the axis of the bore 5 and in the same plane. The bore 6 terminates at its outer end in a conical bore 7. The tongue 3, when the measuring leg is used for limit exterior gauges, is arranged on the outer end of the leg.

A bolt 8 is mounted in the transverse bore 5, and is provided with a threaded bore 9 extending through the bolt 8 and in alinement with bore 6. A screw 10 is inserted in the threaded bore 9 and is provided with a conical head 11 fitting the conical bore 7. By transferring the thread of the screw 10 from the hardened leg 1 into the bolt 8, there is created the advantage that the screw may be cut outside the leg into a non-hardened element; namely into the bolt 8.

Upon rotation of the screw 10, the yieldable tongue 3 is deflected outwardly by the conical head 11 in the manner of a one armed lever; and accordingly, the position of the measuring surface 2' is adjusted. In this manner, it is possible to limit exterior gauges to obtain a very fine adjustment of the exterior dimension of the gauge. By adjusting the outer dimension, one may obtain for instance an exterior dimension combination which corresponds to the greatest dimension. Therefore, when the screw 10 is rotated, for instance, by a screw driver, the tongue 3 is then adjusted in such a manner until the desired measuring combination is produced in the exterior gauges.

The screw 10, as shown in another embodiment of the invention, Figure 3, may also be provided with a ball-shaped head 11' or it may have a head of such a slope that there will be solely a point or line contact between the head 11' and the wall of the bore. Furthermore, in place of the screw 10 with its conical or ball-shaped head 11, or 11', there may also be used as another modification, a short conical threaded plug 12, Figure 4, which is mounted in a conical threaded bore 7' of the measuring leg 1. The adjustment of the measuring surface 2' takes place in this particular embodiment in the same manner as described with reference to Figure 1.

Figure 5 illustrates a limit exterior gauge which is provided with a measuring leg according to the present invention. A second leg 15 of the gauge consists of a conventional measuring leg. A center piece 16 which forms the principal dimension of the gauge constitutes the dimension for accepting ("go") of the gauge while the dimention for discarding ("no-go") is obtained by adjusting the yieldable tongue 3. This construction therefore permits a gauge, constructed in accordange with my invention to be readily adjusted within the range of tolerances desired. Furthermore, in this type of gauge, a grinding of the legs of the gauge is not necessary because no measuring step is provided.

Figure 6 illustrates another modification of the measuring leg 1 of Figure 1 which serves as an eelment for exterior gauges with a preliminary caliper which indicates the oversize dimension ("no-go") or the correct dimension of a work piece being measured. The adjusting device for the yieldable tongue 3 comprises, as shown in Figure 1, the screw 10 which is inserted in the threaded bore 9 of the bolt 8. The screw 10 is provided similarly with the conical head 11 matching the conical bore 8. In addition, however, the tongue 3 is made very sensitive at the point where it is caused to bend so that during the yieldable bending the tongue remains always absolutely straight. For this purpose, there is provided at the point where the tongue is bent a recess 13.

The measuring face 2''' of the measuring surface 2 extends along the entire length of the tongue and forms with respect to the rigid measuring surface 2, a small angle "a." Ordinarily, this small angle "a" is measured only in a few minutes and may be adjusted very accurately by the screw 11. On the side face of the measuring leg 1, Figure 6, within the measuring range of the measuring surface 2''', there is provided a measuring scale 14.

When the measuring leg 1, Figure 6, is produced and when it is necessary to refinish the measuring leg, the measuring surface 2''' is ground and polished at the same time with the other rigid measuring surface 2. For this purpose, the tongue 3 is tensioned by means of the screw 10 with its conical head 11 to such a degree that the measuring surface 2''' comes to lie into the position indicated in the dotted lines, i. e., in alignment with the plane of the face 2. Previously, before the first time the measuring leg 1 is used, the measuring surface 2''' is adjusted to the desired angular position by releasing the screw 10 whereupon the scale lines of the measuring scale 14 are engraved upon the surface.

When the measuring leg 1 constructed according to the embodiment of Figure 6 is to be used for a makeshift go exterior gauge, it will be assembled together with one parallel end dimension or a number of the same which dimension consists of the smallest measuring distance of the gauge. It may then be assembled with a second plane measuring leg in a holder (not shown) to form the desired gauge.

In a fixed one sided go-exterior gauge as shown in Figure 7, the three parts of the gauge: namely, the measuring leg 1, the straight measuring leg 17, and the center part 18 of the gauge, constituting the smallest dimension of the gauge, are pressed together and are screwed together from the interior.

With a gauge constructed in accordance to the embodiment of Figure 7, the dimension of a work piece to be measured may be taken within the permissible tolerances with great accuracy, and the dimension may be that of the measuring scale 14. With this gauge, the smallest dimension may also be determined in the same operation.

It is to be understood that although it is preferred to use any of the adjusting devices as disclosed for the yieldable tongue 3, it is within the scope of the invention, if desired, that the adjusting device may also consist of a rotatable cam having a very small eccentricity.

In using these gauges of the several embodiments illustrated for measuring work pieces, conventional procedure is followed.

It is to be further understood that although the measuring leg provided with the adjustable measuring surface of the several embodiments of my invention has been particularly described with reference to exterior gauges, it is not limited to such use but it may be used for exterior gauges which are provided with different measuring steps within a certain measuring range.

It is also evident that there has been disclosed a measuring leg construction for various forms of gauges which is simple in construction and economical to manufacture, and refinish when worn.

It will be readily understood that the device described can be made in various forms and sizes; without departing from the spirit of the invention, and it will be further understood that I do not limit myself to the particular construction disclosed in the drawings and described in the specification, the scope of the invention being defined in the appended claims.

What I claim is:

1. A measuring leg adapted for fabricating temporary and stationary horseshoe gauges and calipers with an angularly adjustable measuring surface comprising a body and a longitudinally extending tongue integral with said body and provided with a measuring surface, means for adjusting said tongue relative to said body for adjusting the measuring surface, said tongue being formed by a longitudinally directed slot and forming a yieldable portion of said measuring leg, there being provided a transverse bore at the bending point of said tongue, said bore causing a reduction of the cross-sectional area of the tongue at said point, a shaft being inserted in said transverse bore, and a threaded cross bore being formed in said shaft adapted to receive a threaded portion of said aforesaid adjusting means.

2. A measuring leg according to claim 1, in which said adjusting means is provided with a conical head, a conical bore being formed between the measuring leg and said yieldable tongue, said conical head seating said conical bore, whereby, upon actuation of said adjusting means, the yieldable tongue is adjusted.

CURT HERZSTARK.

REFERENCES CITED

The following references are of record in the file of this patent:

UNITED STATES PATENTS

| Number | Name | Date |
|---|---|---|
| 1,913,674 | Kaufmann | June 13, 1933 |
| 2,521,883 | Teevin | Sept. 12, 1950 |
| 2,565,025 | Hohwart et al. | Aug. 21, 1951 |

FOREIGN PATENTS

| Number | Country | Date |
|---|---|---|
| 62,617 | Switzerland | Oct. 24, 1912 |
| 158,693 | Great Britain | Feb. 11, 1921 |
| 231,276 | Switzerland | Mar. 15, 1943 |
| 487,808 | France | May 3, 1918 |
| 523,165 | Great Britain | Nov. 22, 1939 |